UNITED STATES PATENT OFFICE.

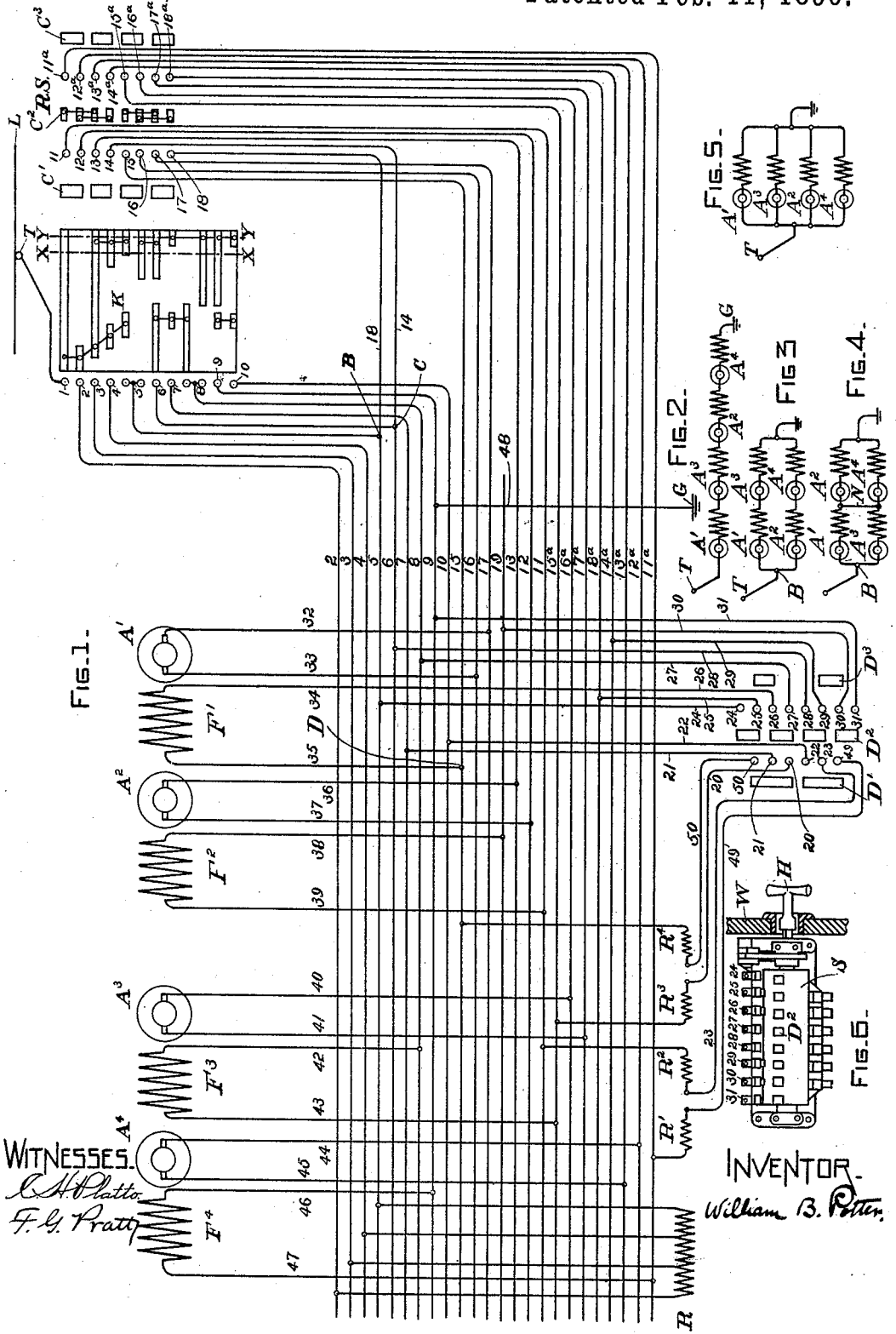

WILLIAM B. POTTER, OF SCHENECTADY, NEW YORK, ASSIGNOR TO THE GENERAL ELECTRIC COMPANY, OF NEW YORK.

CONTROLLER FOR ELECTRIC MOTORS.

SPECIFICATION forming part of Letters Patent No. 554,307, dated February 11, 1896.

Application filed August 5, 1895. Serial No. 558,195. (No model.)

*To all whom it may concern:*

Be it known that I, WILLIAM B. POTTER, a citizen of the United States, residing at Schenectady, county of Schenectady, State of New York, have invented certain new and useful Improvements in Controllers for Electric Motors, (Case No. 259,) of which the following is a specification.

My invention relates to controllers for electric motors, and has for its object to so arrange a controller that it may be adapted to give a greater number of combinations by which the speed of the motors may be regulated than has heretofore been the case. I also combine with the controller mechanism by which in its ordinary operation it may be actuated from its lowest to its highest position, giving the motors a certain number of changes or commutations, and by then throwing a switch the manual operation may be repeated, combining the motors in different manners and giving different rates of speed, so that before the switch for this purpose, which I shall call an "auxiliary switch," has been thrown and after it has been thrown the manual operation of the controller is identical, but the results in the combinations of the motors are different.

In the operation of electric railways where the same road is run within a city and outside of it in suburban or interurban transportation it is sometimes a convenience to have cars which may with the ordinary operation of the controller run up to a certain limit of speed—for instance, twenty miles an hour. Where the same car, however, is to be used outside of the city a much higher rate of speed is often practicable, and the car should be properly equipped to obtain it.

It is the object of the combination of apparatus shown in this application to accomplish this result by combining with the controller the auxiliary switch to which I have referred in the statement of invention, so that when the car comes to a station upon the outskirts of the city (the power-house or car-barn being commonly so located) the switch may be thrown and the controller will then operate the motors at a higher rate of speed than before. By preference I so locate this switch that it may not be operated by the motorman in the ordinary use of the car, my object in so doing being to place beyond his control the means of obtaining higher speeds, as herein pointed out, so that should the car for any reason be delayed it will not be possible for the motorman in charge to run it at a dangerous rate of speed or a speed higher than that permitted within the city streets.

I have illustrated my invention as applied to the now well-known form of series-parallel controller known in the trade as the "type K" controller—such as is described in my Patent No. 524,396, issued August 14, 1894. I have also illustrated it in combination with a peculiar form of reversing-switch, which, however, is not of my invention. I have further illustrated it as applied to an equipment of four motors upon a car.

It is possible to use other combinations and other types of apparatus than the ones described, and still be within the purposes of my invention, which consists, broadly, in the combination of a number of motors, means for regulating the motors from rest to a certain speed, and an auxiliary switch or other means for so changing the combination of the motors that they may range from rest to a certain other higher speed than the one first named without effecting any change in the controlling apparatus itself.

I have illustrated my invention in the accompanying drawings, in which—

Figure 1 is a diagram showing the circuits upon one end of an electric car, the reversing-switch, controlling-switch, and auxiliary switch all being shown as developments of cylindrical switches. Figs. 2, 3, 4, and 5 are the motor combinations, all to be more particularly pointed out hereinafter; and Fig. 6 is a side elevation of the auxiliary switch to which I have referred, with part of the car-wall in section.

I have illustrated the four motors with their armatures connected so as to revolve in the drawings in the same direction. As ordinarily mounted, however, and as is well known in the art, adjacent armatures upon the same truck revolve in opposite directions, and are so geared to the wheels as to give proper direction of rotation to them. My object in illustrating them, as pointed out, is to make the construction entirely clear and readily understood.

In Fig. 1 the motor armatures are numbered A' to A⁴, respectively, and the fields F' to F⁴, respectively. K is the controller, the contacts of which are shown in plane. The fixed contacts are numbered respectively from 1 to 10. R S is the reversing-switch, provided with movable contacts C' C² C³ arranged in rows, the middle set of contacts being cross connected. This, however, is not of my invention. The resistances are indicated diagrammatically, the series resistance at R, and the shunt resistances by which the fields of the motors are weakened for the highest speed are lettered respectively R' to R⁴. The fixed contacts upon the reversing-switch are numbered 11 to 18 and 11ᵃ to 18ᵃ, respectively, and the leads from the controller and reversing-switch are numbered to correspond with the contacts upon those switches with which they respectively connect. One other lead (numbered 19) is employed. The auxiliary switch S is also provided with movable contacts D' D² D³, arranged in rows, and fixed contacts 20 to 31, respectively.

The particular construction of the auxiliary switch is illustrated in Fig. 6, wherein S is the switch and D² the middle set of contacts. W is the side or wall of the car, and H is a key by which the switch is manipulated through the opening in the side of the car, it being provided with a square shaft like a clock-winding mechanism.

The particular combinations of the motors are as illustrated in Figs. 2 to 5. In Fig. 2 the motors are shown in series between the trolley T and the ground. The resistances are not shown in the combinations diagrammatically illustrated, inasmuch as their office is not only well known but specifically pointed out in my patent above referred to. In Fig. 3 the motors are shown connected in two groups in multiple of two each in series, corresponding to the position shown by the dotted lines X X upon the controller K. These are the two running positions of the motors with the switch S in one of its positions; in the case illustrated in the position when the contacts 25 26 and 29 30 are upon the movable contacts D³ or toward the right in Fig. 1. When, however, the switch is in the opposite position and the contacts 20 to 31 are upon the contacts D' and D², respectively, or to the left in Fig. 1, then the motors are combined, as shown in Figs. 4 and 5—that is to say, in multiple series with an equalizer across the connections between the armatures A² A⁴ and the fields F' F³, while Fig. 5 shows all four motors in multiple between the trolley and ground, which is the position adapted for the highest speed.

In the position shown in Fig. 2 the circuit is as follows: Entering in Fig. 1, from the trolley T, to contact 1, by cross connection to contact 2, then through the resistance R, from the resistance by the lead 5, connecting with the lead 18, to contact 18 upon the reversing-switch R S, the fixed contacts of which are supposed to be respectively upon the rows of contact-plates C' and C², passing by the contact-plate from contact 18 to contact 17, by the lead 17 and the lead 32 to the armature A', through that armature by the lead 33 to the lead 16, to contact 16, by the contact-plate in the row C' to contact 15, by the lead 15 and the lead 35, through the field F', by the lead 34, contact 26 upon the switch S, thence to contact 25, the switch being assumed to be in its right-hand position, or with the contacts 20 to 31 upon the movable contacts D² and D³, thence by the lead 25, to the lead 18ᵃ to contact 18ᵃ upon the reversing-switch, by cross connection to contact 16ᵃ, thence by the lead 16ᵃ and the lead 40 to the armature A³, thence through the armature, by the lead 41, to the lead 17ᵃ, from the lead 17ᵃ, to contact 17ᵃ, by cross connection to the contact 15ᵃ, by the lead 15ᵃ and the lead 43, to the field F³, through that field, by the lead 42 to the lead 8, thence to contact 8, by the cross connection upon the controller K to contact 6, by the lead 6 to the lead 14, by the lead 14 to contact 14, to contact 13, by the lead 13 to the lead 36, to the armature A², through that armature, by the lead 37 to the lead 12, to contact 12 on the reversing-switch, contact 11, by the lead 11 and the lead 39 to the field F², through that field, by the lead 38 to the lead 19, by the lead 30 to contact 30 on the switch S, to contact 29, by the lead 29 and the lead 14ᵃ to contact 14ᵃ, by cross connection to the contact 12ᵃ, by the lead 12ᵃ and the lead 44 to the armature A⁴, through the armature A⁴ to the lead 45, to the lead 13ᵃ, by cross connection to contact 11ᵃ, by the lead 11ᵃ and the lead 47 to the field F⁴, through field F⁴, by the lead 46 to the lead 9, and by the lead 48 from the lead 9 to ground.

It will be readily understood that the contacts upon the controller K co-operating with the contacts 2 to 5, respectively, control the resistance R, and that when the contact 4, cross connected to the contact 5, touches its relative contact-plate on the cylinder K the resistance R is cut out, when the motors will take the position shown in Fig. 2. All this will be readily understood from my patent before referred to. When, however, the contacts 1 to 10 of the cylinder K have reached the position indicated by the line $x\ x$, so that the resistance R has been entirely cut out, the motors are in the position shown in Fig. 3. The circuits in this case are as follows: Contact 1 brings in the current from the trolley T and the current then passes immediately to the contact 5 and also to the contact 6. Following the line from contact 5 it passes by the lead 5 to the lead 18, then to contact 18, to contact 17, by the lead 17 to the lead 32, through armature A', by the lead 33 and the lead 16, to contact 16, thence to contact 15, by the lead 15, to lead 35, through field F', by the lead 34, to contact 26 upon the switch S, to contact 25, to lead 18ª, thence to contact 18ª, by cross connection to contact 16ª, to lead 16ª, by the lead 40 to the armature A³, by lead 41 to lead 17ª, to contact 17ª, by cross connection to contact 15ª, by the lead 15ª and the lead 43, through the field F³, by the lead 42 and the lead 8, to contact 9, and by the lead 9 and the lead 48 to ground. The other path of the current in this combination is from the contact 6 upon the controller, by the lead 6 to the lead 14, contact 14 upon the reversing-switch, contact 13, by lead 13 and lead 36, to the armature A², through the armature, by the lead 37 to lead 12, contact 12, contact 11, by lead 11 and lead 39 to field F², through that field, by lead 38 to lead 19, by lead 30 to contact 30 upon the switch S, contact 29, by the lead 29 to lead 14ª, contact 14ª upon the reversing-switch, contact 12ª, by lead 12ª and lead 44 to armature A⁴, through that armature to lead 45, to lead 13ª, contact 13ª upon the reversing-switch, contact 11ª, lead 11ª, and lead 47, through the field F⁴ by lead 46, to lead 9, and by that lead to lead 48, to ground, forming the other path of the combination, as shown in Fig. 3. When the switch S is, however, thrown to the left, so that the contacts 20 to 23 are upon the row of contacts D', and the contacts 24 to 31 are upon the contacts D², the combination shown in Fig. 4 is that first effected by the controller K, and afterward the combination shown in Fig. 5.

It is to be understood, of course, that the controller K is brought to the off position before the switch S is thrown, as this switch carries, in the operation of the car, the entire current, and it is not designed to interrupt the circuit at the switch at any time, that office being performed by the controller. In this position the paths of the current are as follows, it being assumed that the controller K is so far advanced that the contact 5 has touched its relative contact-plate, and therefore that the resistance R is entirely cut out: Entering from the trolley T the current passes to the contact 1 and thence by cross connection to contact 5, thence by the lead to the lead 18, to contact 18 upon the reversing-switch to contact 17, by the lead 17 and lead 32 through the armature A', by the lead 33 and the lead 16 to the contact 16, thence to contact 15, by the lead 15 to the lead 35, through the field F', by the lead 34 to contact 26 upon the switch S, to contact 27, to the lead 8, to contact 8 upon the controller, by cross connection to contact 6, by the lead 6, to lead 14, contact 14 upon the reversing-switch, to contact 13, to the armature A², passing thereto by the lead 36, thence by the lead 37 and the lead 12 to contact 12, to contact 11, by the lead 11 and lead 39 to field F², thence by the lead 38 to lead 19 and lead 30, to contact 30, contact 31, by the lead 31 to the lead 9, by the lead 9 and lead 48 to ground, thus passing in series through the armatures A' and A² and their respective fields, as shown in the upper half of Fig. 4. The other path through the remaining motors is through lead 5 from contact 5, but instead of passing to the right through the lead 18, as in the circuit just traced, it passes to the left to the lead 24, to contact 24, to contact 25, thence to contact 18ª, by cross connection to contact 16ª, thence to lead 16ª and lead 40, through the armature A³, by lead 41 and lead 17ª to contact 17ª, by cross connection to contact 15ª, by lead 15ª and lead 43, through the field F³, by the lead 42, lead 8, to contact 8, by cross connection to contact 6, by the lead 6 and the lead 28 to contact 28 upon the switch S, contact 29, by the lead 29 and the lead 14ª to contact 14ª, by cross connection to contact 12ª, by the lead 12ª and the lead 44 to the armature A⁴, through that armature, by the lead 45 and the lead 13ª to contact 13ª, by cross connection to lead 11ª, by lead 11ª and the lead 47, through the field F⁴, by the lead 46, lead 9, lead 48 to ground, forming the circuit shown in the lower half of Fig. 4. The equalizer N, Fig. 4, is thrown across the ground-terminals of the fields F' F³, and may be traced as follows: by the lead 34, from the terminal of the field F', contact 26 on the switch S, contact 27, by the lead 27, to lead 8, and by that lead and the lead 42 to the terminal of the field F³.

Referring now to Fig. 5, the connections for this figure will be upon the line X X of the controller K, and the paths of the current are as follows: Entering from the trolley T the current passes to contact 1, and then by the various cross connections, either contact-plates or contacts, to contact 5, thence by the lead 5 to the lead 18, by the lead 18 to contact 18, thence to the contact 17 to the lead 17, and by the lead 32 through the armature A' by the leads 33 and 16 to contact 16, contact 15, by the lead 15 and the lead 35, through the field F', by the lead 34 to contact 26 upon the switch S, to contact 27, to the lead 8, to contact 8 upon the controller, by cross connection to contact 9 and by the lead 9 and lead 48 to ground. Another path of the current is from contact 5 upon the controller, by the lead 5, passing to the left at the point B, by the lead 24, contact 24 upon the switch S, contact 25, by the lead 25 and the lead 18ª, to contact 18ª, then to contact 16ª, by the lead 16ª and the lead 40, through the armature A³, lead 41 and lead 17ª, to contact 17ª, by cross connection to contact 15ª, by the lead 15ª and the lead 43, through the field F³, by the lead 42 and the lead 8 joining the path of the current from the motor 1, thence to contact 8 upon the controller, and by cross connection contact 9, by lead 9 and lead 48 to ground. The paths for the other two motors start from contact 6 upon the controller, which, it will be noticed, is cross connected to contact 5 by the cross connection between the two contact-plates. Starting from contact 6 the current proceeds to the point C, lead 6, thence passing to the right by the lead 14 to contact 14 upon the reversing-switch, contact 13, by the lead 13 and lead 36, through the armature A², by the lead 37 and lead 12, contact 12, contact 11, by the lead 11 and lead 39, through the field $F^2$, by the lead 38 to lead 19, by lead 30, to the contact 30, to contact 31, by the lead 31, to lead 9, and by that lead and lead 48 to ground. Starting from the point C again, the current passes to the left along the lead 6, thence down the lead 28 to contact 28 upon the switch S, contact 29, by lead 29 to lead $14^a$, contact $14^a$ upon the reversing-switch, by cross connection to contact $12^a$, by the lead $12^a$ and lead 44, through the armature $A^4$, by lead 45 and lead $13^a$, to contact $13^a$, to contact $11^a$, by lead $11^a$ and lead 47, through the field $F^4$, by the lead 46 to lead 9, by that lead and lead 48 to ground, thus putting the four motors in multiple between the trolley and ground, as in Fig. 5.

The office of the resistances $R'$ to $R^4$ is to shunt the motor-fields and thereby obtain a higher rate of speed than is due to the full magnetization, by weakening the fields in ways well known in the art. During the first operation of the controller, or when the switch S is in its first position, as already described, these resistances are not employed, and their contacts are opened upon the switch S. By tracing the circuits it will be found that if the resistances were used in this position they would not act to shunt the fields only, but would also in part shunt the armatures of the motors or act as a direct shunt around the motor to ground, and thus would throw the apparatus out of balance, as would be well understood. When, however, the switch is in its other position, so that the motors are combined as in Figs. 4 and 5, the resistances are employed and the contacts between them are connected by the plates upon the switch S. The circuits for this combination will not be specifically pointed out, they being substantially the same as in Figs. 4 and 5, except that the contacts on the switch act to couple in the resistances in the manner pointed out, one for each field.

It will be observed from Figs. 1 and 6 that the contacts of the switch S are so arranged that while the rows $D'$ $D^2$ of contact-plates simultaneously touch the contacts 24 to 31, 20 to 23, 49 and 50, the row of contacts $D^3$ is spaced differently from the others, the space between this row and the row $D^2$ being greater than between $D'$ and $D^2$. By this means when the row $D^3$ connects the contacts 25 and 26 and 29 and 30, the rows $D'$ and $D^2$ open-circuit all of the other contacts, and thus the resistances $R'$ to $R^4$ will be open-circuited, as already pointed out.

I have described the device which I have invented as operating in one way—that is, to so change the controller contacts and circuits that the speed of the motors may be increased in the second position of the switch from that possible in the first position.

It is manifest that the reverse operation of the switch is also contemplated in my invention and is to be included in the scope of the claims.

It is also manifest that I do not limit myself to the particular types of apparatus illustrated, as switches of other forms might be used, and the combination may readily be adapted to other forms of controlling apparatus than the ones illustrated without affecting the essence of my invention, such modifications being readily apparent to those skilled in the art.

What I claim as new, and desire to secure by Letters Patent of the United States, is—

1. A controlling mechanism for electric motors, comprising a series-parallel controlling-switch having suitable circuits and contacts adapted to regulate the motors from rest to a certain speed, and an auxiliary switch adapted to modify the circuits so that the controlling-switch may regulate the motors from rest to another or different speed.

2. A controlling mechanism for electric motors, comprising a series-parallel controlling-switch having contacts and connections adapted to regulate the motors from rest to a certain definite speed, and in combination therewith an auxiliary switch provided with contacts adapted to modify the circuits so that the controlling-switch may regulate the motors from rest to a higher speed than that of its first operation.

3. In combination, an electric-railway car, a plurality of motors upon the car, a series-parallel controlling-switch regulating the motors from rest to a certain speed, through series and multiple-series positions and an auxiliary switch modifying the circuits of the controller so that by its operation after the auxiliary switch is thrown the motors will be regulated through multiple series and multiple positions from rest to a different speed from that possible with the first operation of the controller.

4. In an electric-railway car, in combination with a series-parallel controlling-switch, a circuit-modifying or auxiliary switch located out of the control of the motorman or other operative, adapted to change the combination of motors and controlling-circuits so that in one of the positions of the auxiliary switch the motors may be run at one speed by the controller and in the other position thereof may be run at a different speed.

5. A controlling mechanism for electric motors, comprising a series-parallel controlling-switch having suitable circuits and contacts for regulating the motors from rest to a certain speed, and circuit-modifying means whereby the controlling-switch may regulate the motors from rest to a different speed.

In witness whereof I have hereunto set my hand this 31st day of July, 1895.

WILLIAM B. POTTER.

Witnesses:
 B. B. HULL,
 A. F. MACDONALD.